(12) United States Patent
Gourlay

(10) Patent No.: US 6,850,980 B1
(45) Date of Patent: Feb. 1, 2005

(54) CONTENT ROUTING SERVICE PROTOCOL

(75) Inventor: Douglas Gourlay, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 688 days.

(21) Appl. No.: 09/595,774

(22) Filed: Jun. 16, 2000

(51) Int. Cl.$^7$ .............................................. G06F 15/173
(52) U.S. Cl. ...................... 709/226; 709/105; 709/201; 709/216; 709/225; 709/238; 370/249; 370/389; 370/397; 370/408; 379/220.01; 711/3; 711/138
(58) Field of Search ................................ 709/203, 226, 709/232, 238, 243, 245; 711/3, 120

(56) References Cited

U.S. PATENT DOCUMENTS

| | | | |
|---|---|---|---|
| 4,403,286 A | * | 9/1983 | Fry et al. |
| 4,456,957 A | | 6/1984 | Schieltz ...................... 364/200 |
| 4,506,358 A | | 3/1985 | Montgomery ................. 370/60 |
| 4,769,811 A | | 9/1988 | Eckberg, Jr. et al. .......... 370/60 |
| 4,771,425 A | | 9/1988 | Baran et al. ................... 370/85 |
| 4,819,228 A | | 4/1989 | Baran et al. ................... 370/85 |
| 4,903,261 A | | 2/1990 | Baran et al. ................ 370/94.2 |
| 4,962,497 A | | 10/1990 | Ferenc et al. ............... 370/60.1 |
| 5,020,058 A | | 5/1991 | Holden et al. ............... 370/109 |
| 5,088,032 A | | 2/1992 | Bosack ........................ 395/200 |
| 5,095,480 A | | 3/1992 | Fenner ....................... 370/94.1 |
| 5,136,580 A | | 8/1992 | Videlock et al. .............. 370/60 |
| 5,247,639 A | * | 9/1993 | Yamahata |
| 5,313,582 A | | 5/1994 | Hendel et al. ............... 395/250 |
| 5,394,394 A | | 2/1995 | Crowther et al. ............. 370/60 |
| 5,408,472 A | | 4/1995 | Hluchyj et al. ............. 370/94.1 |
| 5,430,715 A | | 7/1995 | Corbalis et al. ............... 370/54 |
| 5,473,607 A | | 12/1995 | Hausman et al. ......... 370/85.13 |
| 5,485,455 A | | 1/1996 | Dobbins et al. ............... 370/60 |
| 5,497,371 A | | 3/1996 | Ellis et al. .................... 370/60 |
| 5,502,725 A | | 3/1996 | Pohjakallio ................ 370/94.1 |
| 5,513,172 A | | 4/1996 | Shikama et al. .............. 370/13 |
| 5,517,494 A | * | 5/1996 | Green |
| 5,519,704 A | | 5/1996 | Farinacci et al. ......... 370/85.13 |

(List continued on next page.)

FOREIGN PATENT DOCUMENTS

| | | | |
|---|---|---|---|
| EP | 0 567 217 A2 | 10/1993 | ........... H04L/12/46 |
| WO | WO 93/07569 | 4/1993 | ........... G06F/13/40 |
| WO | WO 93/07692 | 4/1993 | ............. H04J/3/24 |
| WO | WO 94/01828 | 1/1994 | ........... G06F/15/40 |

OTHER PUBLICATIONS

McKeown, et al., "The Bay Bridge: A High Speed Bridge/Router", May 1992, IFIP PfHSN Workshop, Stockholm Sweden.

Primary Examiner—Michael Won
(74) Attorney, Agent, or Firm—Thelen Reid & Priest LLP; Marc S. Hanish

(57) ABSTRACT

Layer 7 switching may be accomplished using one or more caches placed throughout a computer network. Changes to a file on a server may be detected and propagated throughout the network. At the switch or router level, once notification of changes to a file is received, the content may be retrieved from the server and placed in a connected cache. A routing table entry may be created for the content and also placed in the cache. The routing table entry may contain an original location field identifying the original location of the content, a distance field indicating a distance from the cache to the server, and a field indicating a version number of the content. Additional fields may also be contained within the routing table entry. When a user requests a specific file, rather than forward the request directly to the server containing the original file, the request may be handled by the router closest to the user which has a connected cache containing the content. This allows a user's request to be handled much more quickly and efficiently than prior art solutions.

89 Claims, 6 Drawing Sheets

| | | |
|---|---|---|
| URL | http://www.cnn.com/logos/logo.gif | 300 |
| IP/Port | 171.68.62.5:80 | |
| Metric | 2 | |
| Serial/Version # | 2 | 302 |
| Billing Token | 6687945 | |
| Date/Time Stamp | 3-17-2000:23:04:56 | |
| Tag | 16 | |

U.S. PATENT DOCUMENTS

| | | | |
|---|---|---|---|
| 5,528,592 A | * | 6/1996 | Schibler et al. |
| 5,561,669 A | | 10/1996 | Lenney et al. .............. 370/60.1 |
| 5,570,361 A | | 10/1996 | Norizuki et al. ............ 370/60.1 |
| 5,574,875 A | * | 11/1996 | Stansfield et al. |
| 5,583,862 A | | 12/1996 | Callon ......................... 370/397 |
| 5,617,421 A | | 4/1997 | Chin et al. ................... 370/402 |
| 5,699,521 A | | 12/1997 | Iizuka et al. ............ 395/200.15 |
| 5,764,641 A | | 6/1998 | Lin .............................. 370/412 |
| 5,764,756 A | | 6/1998 | Onweller ..................... 379/242 |
| 5,774,660 A | * | 6/1998 | Brendel et al. |
| 5,799,141 A | | 8/1998 | Galipeau et al. ........ 395/182.11 |
| 5,802,047 A | | 9/1998 | Kinoshita .................... 370/359 |
| 5,867,495 A | | 2/1999 | Elliott et al. ................. 370/352 |
| 5,872,783 A | | 2/1999 | Chin .......................... 370/392 |
| 5,878,031 A | * | 3/1999 | Ahmad et al. |
| 5,883,893 A | | 3/1999 | Rumer et al. ................ 370/395 |
| 5,974,129 A | * | 10/1999 | Bodnar |
| 5,991,810 A | | 11/1999 | Shapiro et al. .............. 709/229 |
| 6,011,910 A | | 1/2000 | Chau et al. ............. 395/200.59 |
| 6,018,770 A | | 1/2000 | Little et al. .................. 709/223 |
| 6,021,415 A | | 2/2000 | Cannon et al. .............. 707/206 |
| 6,078,963 A | * | 6/2000 | Civanlar et al. |
| 6,167,438 A | * | 12/2000 | Yates et al. |
| 6,535,509 B2 | * | 3/2003 | Amicangioli |
| 6,546,422 B1 | * | 4/2003 | Isoyama et al. |

* cited by examiner

| URL | http://www.cnn.com/logos/logo.gif | 300 |
| --- | --- | --- |
| IP/Port | 171.68.62.5:80 | |
| Metric | 2 | |
| Serial/Version # | 2 | 302 |
| Billing Token | 6687945 | |
| Date/Time Stamp | 3-17-2000;23:04:56 | |
| Tag | 16 | |

CONTENT ROUTING SERVICE PROTOCOL

BACKGROUND OF THE INVENTION

1. Field of the Invention

The present invention relates to the field of network communications. More specifically, the present invention relates to the use of a content routing service protocol to provide distributed Layer 7 switching in a computer network.

2. The Background

Most computer networked application architectures are organized as a series of layers, each layer built upon the one below it. The Open Systems Interconnect model is to have seven layers (L1–L7) in the system. Switching has historically taken place on Layers 2 and 3, with a recent emergence of Layer 4. In L2 switching, a local Media Access Control (MAC) address may be used to determine where to forward each packet. For this reason, L2 switching is not favored for large-scale networks such as the Internet or any LAN with more than two hundred and fifty nodes because of broadcast radiation issues.

L3 switching involves making a decision on where to forward each packet based on an IP (or similar) address located in the header of the packet. Due to its scaleability, L3 is currently the industry-standard for interconnecting networks and in the core of corporate LANs.

Layer 4 (L4) switching has been steadily gaining acceptance in the industry. L4 switching employs the information contained within the Transport Layer header to assist in switching and traffic handling. The L4 information indicates which protocol type is contained within each IP packet. Thus, L4 switching provides for several advantages: packet filtering, security, and quality of service. These are important features of L4 switching. However, the most crucial feature is server load balancing.

In server load balancing, a collection of physical servers, each with a different IP address, may support the same application service and be defined as a single virtual server. This virtual server becomes the single "logical server" with a single IP address. Therefore, rather than communicating directly with the real IP addresses of the physical servers, users direct traffic to the virtual server address.

In order to make this transition transparent to the user, a L4 switch may be used to direct the traffic to an appropriate server based on current traffic conditions. This also provides for the most effective use of the servers during high traffic conditions. FIG. 1 is a block diagram illustrating server load balancing. A server load balancer 2 in a L4 switch receives a syn packet from a user 4. The syn packet may have a destination address indicating the single virtual server. The server load balancer 2 then rewrites the destination address in the syn packet as one of the servers' 6*a*, 6*b*, 6*c* IP address. In doing so, it may attempt to balance the current traffic load evenly among the servers 6*a*, 6*b*, 6*c*.

Layer 7 (L7), also known as application level switching, has been a goal of many companies for years. In L7 switching, the directing of packets may occur on a content level basis, where packets are directed to appropriate destinations based on the type of information they contain. Currently, some companies claim to have L7 switching capabilities, but their solutions involve routing packets based on destination IP address using a statically configured group of servers via a generic predictor algorithm. True L7 switching would allow content to be distributed throughout the Internet much in the same way some television programming is syndicated to individual stations rather than shown on a network.

FIG. 2 is a diagram illustrating a normal transaction involving a user's request for content. User 100 may wish to view content delivered by www.contentprovider.com. In order to do this, the user 100 must directly contact contentprovider.com's servers 102 to request the content. An IP syn packet must be sent to initiate a session, followed by an ack packet sent as a response contentprovider.com's servers 102. Then a request for content must be sent, followed by contentprovider.com's servers 102 returning the content to the user. Not only might this involve many "hops" on the Internet (and thus subject the request to traffic and other delays), but it also increases the danger of the user not being able to view the content, such as if contentprovider.com's servers 102 are down, or a switch 104 connected to its servers 102 is down.

If there was a solution that provided for true content-based routing, the content could be distributed at different points on the Internet and a direct connection to contentprovider.com's servers 102 need not occur. With the explosive growth of the Internet, it would be beneficial to have such a solution.

SUMMARY OF THE INVENTION

Layer 7 switching may be accomplished using one or more caches placed throughout a computer network. Changes to a file on a server may be detected and propagated throughout the network. At the switch or router level, once notification of changes to a file is received, the content may be retrieved from the server and placed in a connected cache. A routing table entry may be created for the content and also placed in the cache. The routing table entry may contain an original location field identifying the original location of the content, a distance field indicating a distance from the cache to the server, and a field indicating a version number of the content. Additional fields may also be contained within the routing table entry. When a user requests a specific file, L1, rather than forward the request directly to the server containing the original file, the request may be handled by the router closest to the user which has a connected cache containing the content. This allows a user's request to be handled much more quickly and efficiently than prior art solutions.

DETAILED DESCRIPTION OF A PREFERRED EMBODIMENT

In the following description, a preferred embodiment of the invention is described with regard to preferred process steps and data structures. However, those skilled in the art will recognize, after perusal of this application, that embodiments of the invention may be implemented using at least one general purpose computer operating under program control, and that modification of the general purpose computer to implement the components, process steps, and/or data structures described herein would not require undue invention.

In accordance with a presently preferred embodiment of the present invention, the components, process steps, and/or data structures are implemented using software. This implementation is not intended to be limiting in any way. Different implementations may be used and may include other types of operating systems, computing platforms, program storage devices and/or computer programs. In addition, those of ordinary skill in the art will readily recognize that devices of a less general purpose nature, such as hardwired devices, devices relying on FPGA (field programmable gate array) or ASIC (application specific integrated circuit) technology, or the like, may also be used without departing from the scope and spirit of the inventive concepts disclosed herewith.

Figure 1:
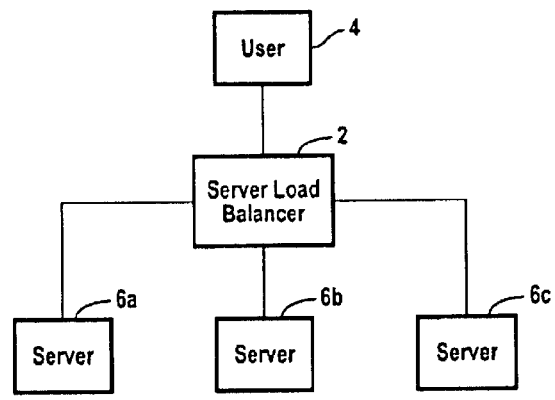
FIG. 1 is a block diagram illustrating server load balancing.
Figure 2:
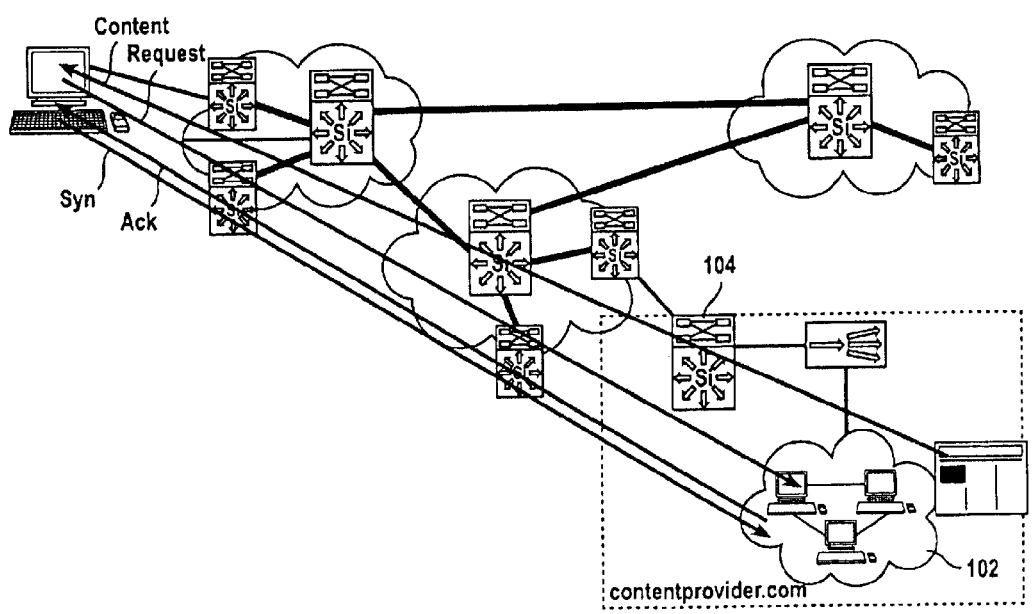
FIG. 2 is a diagram illustrating a normal transaction involving a user's request for content.
Figure 3:
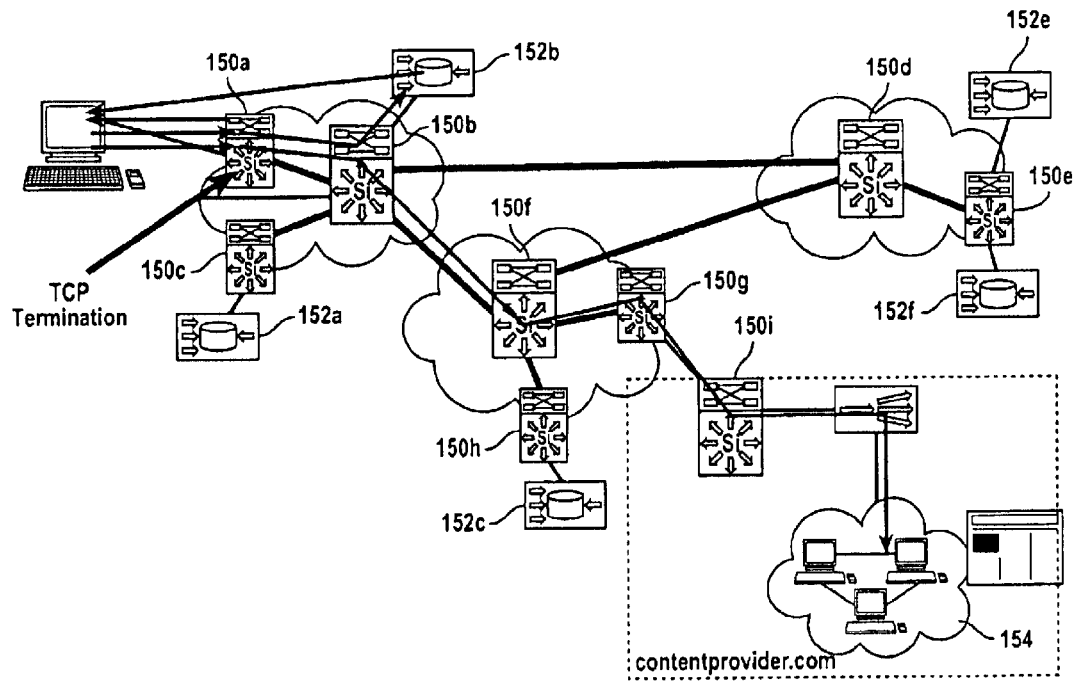
FIG. 3 is a block diagram illustrating a system for content routing in a computer network in accordance with a specific embodiment of the present invention.

FIG. 3 is a block diagram illustrating a system for content routing in a computer network in accordance with a specific embodiment of the present invention. Switches 150a–150i permeate the system. Attached to one or more of the switches 150a–150i is a cache 152a–152f. The caches 152a–152f also may store the content locally to improve speed and bandwidth. The caches 152a–152f may each store a routing table. The routing table may have a record for each piece of content stored in the cache. The content may then be identified by an http url address. However, the address may point to a specific file (such as "www.contentprovider.com/logos/logo.gif") or to a higher-level directory (such as "www.contentprovider.com/logos", indicating all files and subdirectories contained within the higher level directory).

Figure 4:
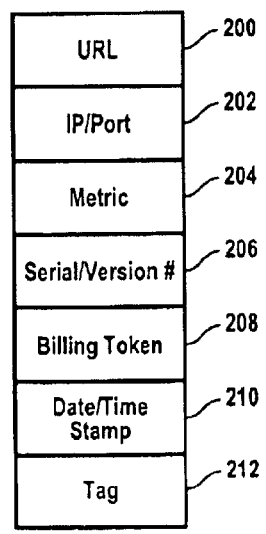
FIG. 4 is a diagram illustrating the format of each record in accordance with a specific embodiment of the present invention.

FIG. 4 is a diagram illustrating the format of each record in the routing table accordance with a specific embodiment of the present invention. A URL field 200 contains an http-style address as discussed above. An IP/Port field 202 may indicate the IP address and/or port from which the content originated. A Metric field 204 may indicate the distance from the switch to the content. Bandwidth and delay could be initial metrics. A Serial Number field 206 may indicate a serial number or version number for the content. A Billing token field 208 may be used to exchange tokens between service providers or between a service provider and a content provider. This allows the use of content to be tracked by a single identifier per content provider. This also allows for an 800 number style billing system.

A Date/Time stamp field 210 records the date and time of the last update to the record, which is important in synchronizing records across routers. Finally, an additional tag field 212 is provided for other functions, such as how to handle an object. Various options have been contemplated, such as storing a route in a routing table permanently for a more static-type routing, updating content serving sites, bypassing the cache, or applying a Quality of Service (QoS) parameter based on billing tags, uris, etc.

Referring back to FIG. 3, when a user wishes to view content created by contentprovider.com, as usual he will generate an http request packet with the corresponding http url (for example, "www.contentprovider.com/logos/logo.gif"). A normal http request packet requires a three-way handshaking procedure with a switch or router. SYN and ACK fields in the headers of the packets sent between the switch or router and the user indicate the stages of handshaking. When SYN=1 and ACK=0, the packet is an "open connection" packet sent by the user. When SYN=1 and ACK=1 the packet is an "open connection acknowledgement" packet sent by the switch or router. Finally, when SYN=0 and ACK=1 the packet indicates that the user is ready to send data. This results in a delay until at least the 4th packet is processed before the switch or router can examine information in the header of the payload packets.

Eliminating the delay would allow a switch or router to determine whether or not it wishes to even establish a TCP/IP session based on content-specific information. This packet is forwarded to the closest switch 150a. However, rather than simply forward the request packet to another switch with the intention of eventually getting the packet to contentprovider.com's servers 154 for processing, the switch 150a may examine the routing table stored in its cache, assuming it has a cache, searching for an entry with the identical url. If one with an identical url exists, then the content resides in the local cache and the request packet need not be forwarded to contentprovider.com's servers 154. Additionally, a TCP/IP session may then be established to fetch the content from the local cache and send it to the user. Should the nearest switch's cache not have an entry for that url (or the switch not contain a cache at all), the request packet may simply be forwarded to the next closest switch 150b en route to contentprovider.com's servers without establishing a TCP/IP session between the previous switch or router and the user. Then the next switch may check its local cache much in the same way. Thus, the worst-case scenario is that none of the switches en route to contentprovider.com's servers contain the content in their local caches, and the content need only be retrieved directly at contentprovider.com's servers 154. However, if content distribution is done properly, then many times this worst-case scenario can be avoided and the content may be retrieved from a cache located at a point much closer to the user than contentprovider.com's servers 154. The distance from a particular cache to the content provider's servers may be determined by examining the distance field in the record for the content in the cache's routing table.

Thus, the speed of accessing any particular piece of content has been greatly enhanced. Additionally, the reliability has also been enhanced, as users will be able to access contentprovider.com content even if contentprovider.com's servers 154 are down or unreachable.

The http request packet may take a different form than it has in the past in order to facilitate this design. Rather than send a SYN=1, ACK=0 packet (also called a syn packet) alone to initiate the session, a special payload called a HUP packet will be appended to the syn packet. The HUP packet will contain the full url of the http address being requested. This packet will take the form A-C-B, where A is the top-level domain name (e.g. "www.contentprovider.com"), C is the file name (e.g. "logo.gif"), and B is the rest of the address (e.g. "/logos/"). In this way, the router or switch has the ability to determine how to handle the request based on just the top level domain name (e.g. "this router does not have any content from contentprovider.com, thus forward the request elsewhere) or based on just the top level domain name and the file type (e.g. "this router has been instructed to forward all requests for .gif files to a special cache").

Figures 5, 6:
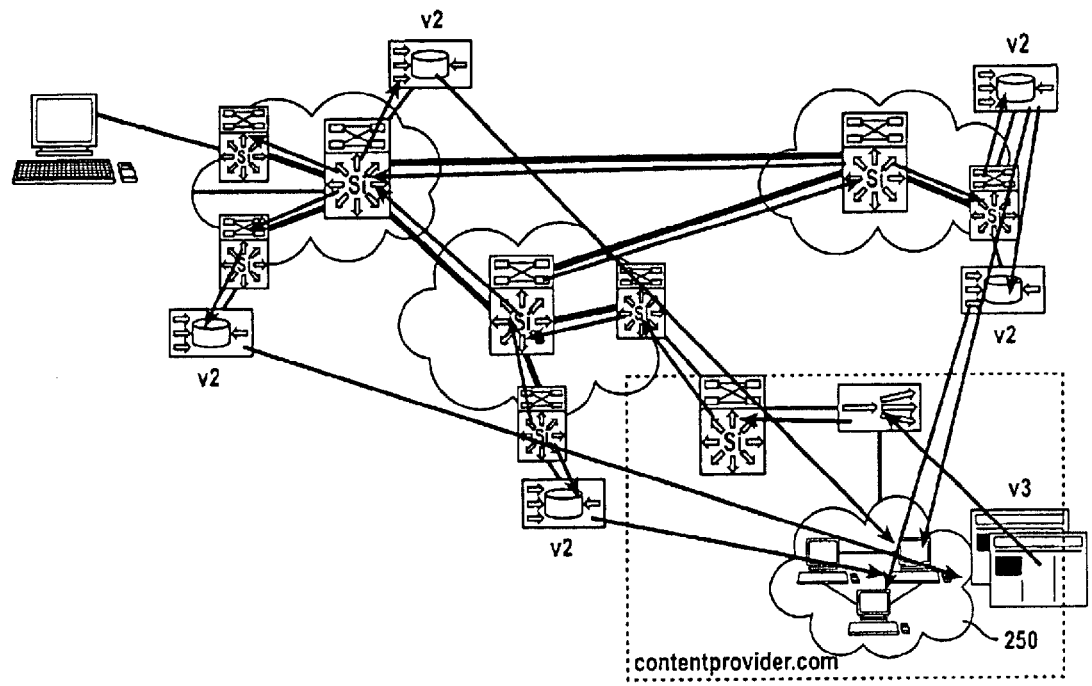
FIG. 5 is a diagram illustrating how content changes may be propagated through the system for content switching in accordance with a specific embodiment of the present invention.
FIG. 6 is a diagram illustrating an example of a routing table entry.

Turning now to the distribution of the content throughout the network, FIG. 5 is a diagram illustrating how content changes may be propagated through the system for content switching in accordance with a specific embodiment of the present invention. A content based web site 250, such as contentprovider.com, may provide various graphics, web pages, and other files as content to be distributed to various users throughout the Internet. For purposes of this example, the url www.contentprovider.com/logos/logo.gif is used to represent one of the content files contentprovider.com provides. Version 2 of this logo may be already stored in caches throughout the network.

FIG. 6 is a diagram illustrating an example of a routing table entry. As can be seen, the entry for "http://www.contentprovider.com/logos/logo.gif" 300 has serial/version number 2 302. When the logo is changed on contentprovider.com to version 3, there is a situation where the content needs to be undated in multiple sites throughout the network. Referring back to FIG. 5, the server 250 may generate a route to the nearest switch (alternatively, a server load balancing platform may detect the content change and advertise the change to an upstream peer). The nearest switch may then examine its local routing table, looking for an entry sharing the same original location url in the url field. If one exists, the version numbers may be compared to determine if the content needs to be updated. Assuming the information received indicates a higher version number than the one already stored in the cache, the cache will undertake to update the content, including requesting the new version of the content from the server 250, storing the new content in the cache, updating its local routing table with the new version number, and updating the time/date stamp. The route may be propagated throughout the network until the logo with version 3 is known on all switches/routers.

At any particular cache, once the content update is received, the routing table entry may be updated. This will generally include at least changing the date/time stamp and the serial/version number.

Figure 7:
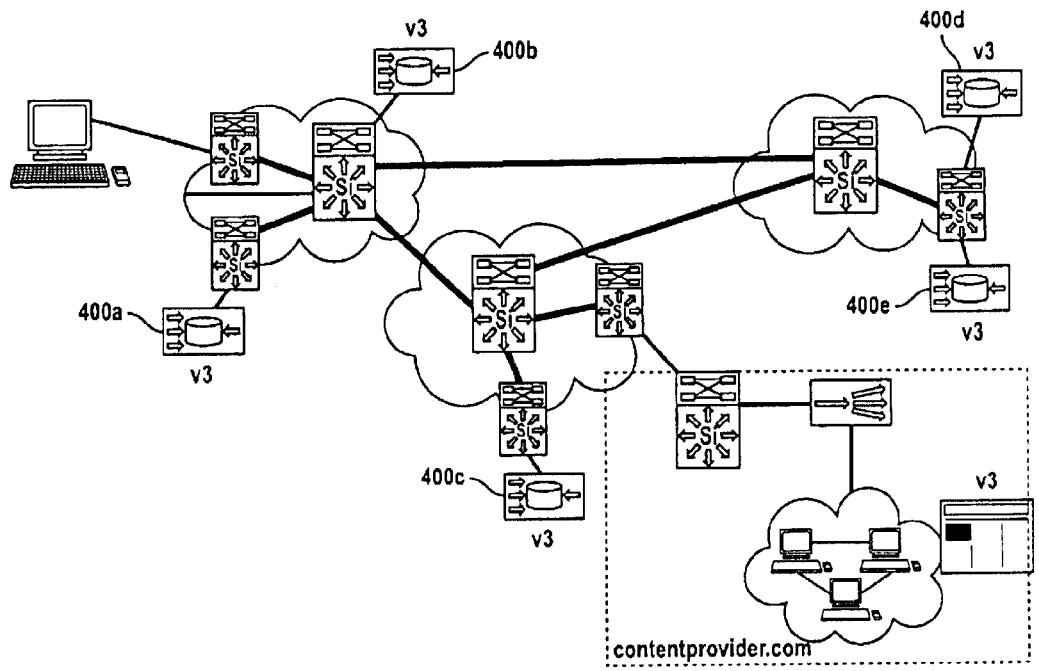
FIG. 7 is a diagram illustrating how the system for content switching in accordance with a specific embodiment of the present invention would appear after content changes have been propagated throughout the network.

FIG. 7 is a diagram illustrating how the system for content switching in accordance with a specific embodiment of the present invention would appear after content changes have been propagated throughout the network. Version 3 of the content is now stored in one or more of the caches 400*a*–400*e* distributed throughout the network. Additionally, routing table entries for the content at the one or more caches 400*a*–400*e* now contain the updated version number and time stamp.

Other updates to the routing tables may be accomplished via a similar process. Examples of other updates include deletion of the content, addition of new content, alteration of the tag field, and alteration of the billing token field.

Figure 8:
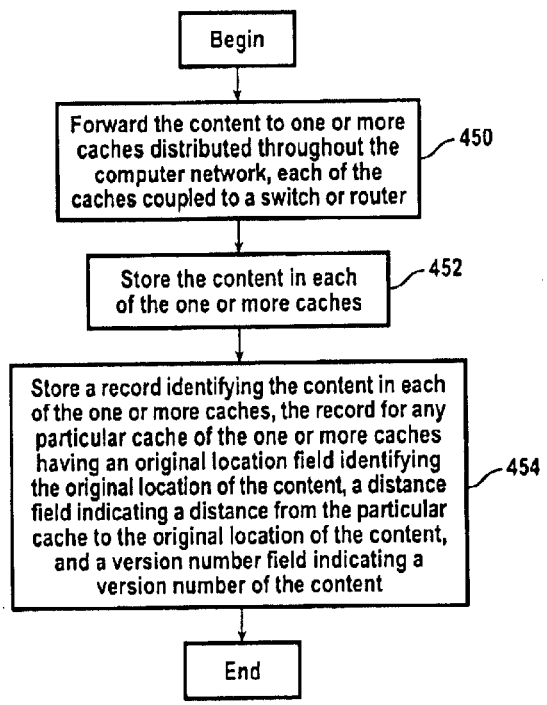
FIG. 8 is a flow diagram illustrating a method for making content available for users in a computer network in accordance with a specific embodiment of the present invention.

FIG. 8 is a flow diagram illustrating a method for making content available for users in a computer network in accordance with a specific embodiment of the present invention. At 450 the content is forwarded to one or more caches distributed throughout the computer network, each of the caches coupled to a switch or router. At 452 the content is stored in each of the one or more caches. Finally, at 454, a record identifying the content is stored in each of said one or more caches, said record for any particular cache of said one or more caches having an original location field identifying the original location of said content, a distance field indicating a distance from said particular cache to said original location of said content, and a version number field indicating a version number of said content.

Figure 9:
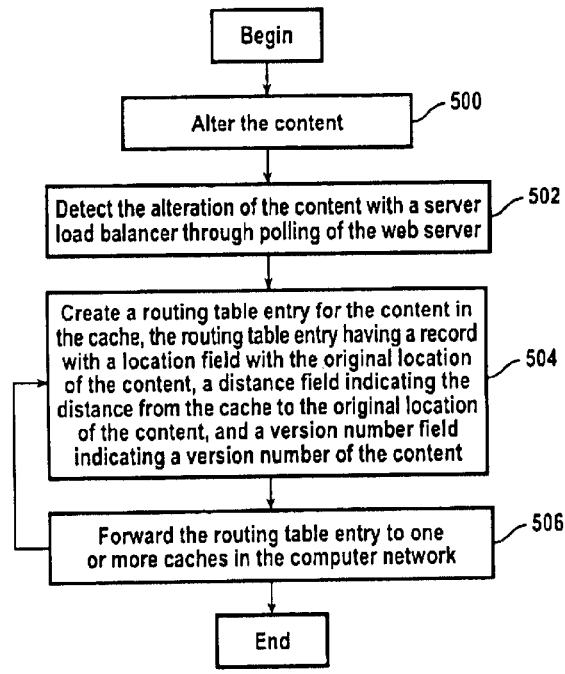
FIG. 9 is a flow diagram illustrating a method for updating content in a computer network, the content located at a web server and having an original location, in accordance with another embodiment of the present invention.

FIG. 9 is a flow diagram illustrating a method for updating content in a computer network, the content located at a web server and having an original location, in accordance with another embodiment of the present invention. The original location of the content may be in the form of an http url. At 500, the content is altered. For example, a logo may be changed to a newer version. At 502, the alteration of the content is detected with a server load balancer through polling of the web server. Alternatively, the web server may directly notify the server load balancer when an update has been performed. At 504, a routing table entry is created for the content in a cache, said routing table entry having a record with a location field with the original location of said content, a distance field indicating the distance from said cache to the original location of said content, and a version number field indicating a version number of said content. The record may also include an IP address field that indicates the IP address and/or port of the web server. Fields indicating the date and time of the last update to the record, billing tokens or certificates for content peering between providers, Quality of Service processes to be applied when a user attempts to access the content, whether the content need not be stored in the cache, and server load balancing processes to be applied when a user attempts to access the content may also be added.

At 506, said routing table entry is forwarded to another of one or more caches in the computer network. The creating and forwarding are then repeated for each of said one or more caches. The distance from a cache to the original location may be recomputed when the routing table entry is forwarded to the cache. Additionally, for each cache it may be determined whether a record corresponding to an older version of the content is already stored in the cache and the content may be retrieved from the original location and stored in the cache if a record corresponding to an older version of the content is already stored in the cache.

Figure 10:
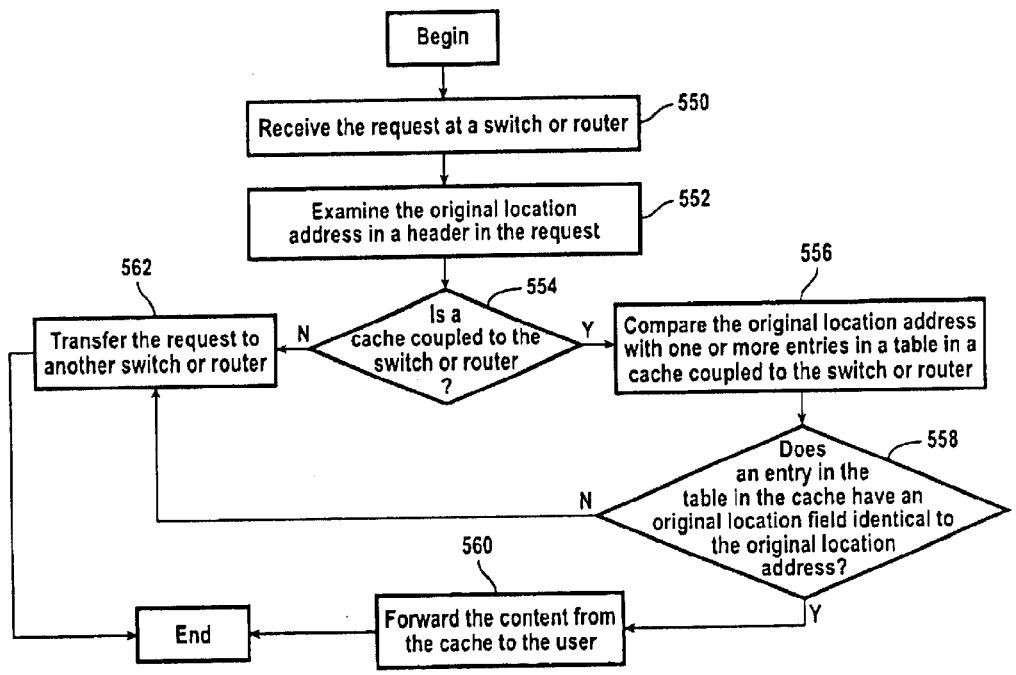
FIG. 10 is a flow diagram illustrating a method for handling a request for content from a user in a computer network in accordance with another embodiment of the present invention.

FIG. 10 is a flow diagram illustrating a method for handling a request for content from a user in a computer network in accordance with another embodiment of the present invention. At 550, the request is received at a switch or router. At 552, an original location address in a header in the request is examined. At 554, it is determined if a cache is coupled to the switch or router. At 556, the original location address is compared with one or more entries in a table in a cache coupled to the switch or router, if such a cache exists. At 558, it is determined if an entry in the table in the cache has an original location field identical to the original location address. At 560, the content is forwarded from the cache to the user if an entry in the table in the cache has an original location field identical to said original location address. On the other hand, if the cache does not exist or the cache does not have an entry in the table with an original location field identical to the original location address, at 562 the request is transferred to another switch or router. The switch or router it is forwarded to should be one that is further along in a path ending with a web server hosting the content. This ensures that if no caches contain the content it will still be possible for the user to retrieve the content directly from the web server.

Figure 11:
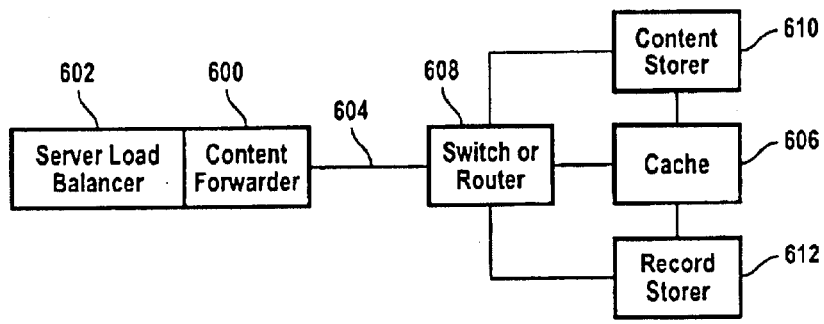
FIG. 11 is a block diagram illustrating an apparatus for making content available for users in a computer network in accordance with a specific embodiment of the present invention.

FIG. 11 is a block diagram illustrating an apparatus for making content available for users in a computer network in accordance with a specific embodiment of the present invention. A content forwarder 600 coupled to a server load balancer 602 forwards content through the computer network 604 to one or more caches 606 distributed throughout the computer network, each of the caches coupled to a switch or router 608. A content storer 610 coupled to said cache 606 and said switch or router 608 stores content in the cache 606. A record storer 612 coupled to said cache 606 and said switch or router 608 stores a record in said cache 606, the record identifying the content in each of said one or more caches, said record for any particular cache of said one or more caches having an original location field identifying the original location of said content, a distance field indicating a distance from said particular cache to said original location of said content, and a version number field indicating a version number of said content.

Figure 12:
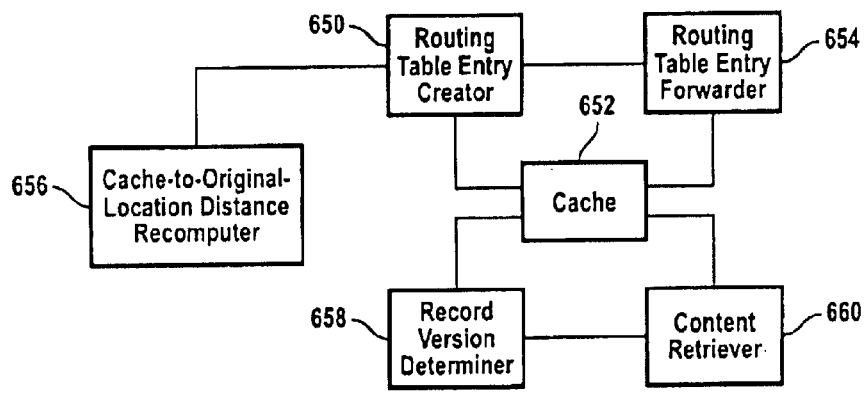
FIG. 12 is a block diagram illustrating an apparatus for updating content in a computer network, the content located at a web server and having an original location, in accordance with another embodiment of the present invention.

FIG. 12 is a block diagram illustrating an apparatus for updating content in a computer network, the content located at a web server and having an original location, in accordance with another embodiment of the present invention. The original location of the content may be in the form of an http url. The content is altered at a server. For example, a logo may be changed to a newer version. The alteration of the content is detected with a server load balancer through polling of the web server. Alternatively, the web server may directly notify the server load balancer when an update has been performed. A routing table entry creator 650 creates a routing table entry for the content in a cache 652, said routing table entry having a record with a location field with the original location of said content, a distance field indicating the distance from said cache 652 to the original location of said content, and a version number field indicating a version number of said content. The record may also include an IP address field that indicates the IP address and/or port of the web server. Fields indicating the date and time of the last update to the record, billing tokens or certificates for content peering between providers, Quality of Service processes to be applied when a user attempts to access the content, whether the content need not be stored in the cache, and server load balancing processes to be applied when a user attempts to access the content may also be added.

A routing table entry forwarder 654 coupled to said routing table entry creator forwards the routing table entry to another of one or more caches in the computer network. The creating and forwarding are then repeated for each of said one or more caches. The distance from a cache 652 to the original location may be recomputed when the routing table entry is forwarded to the cache using a cache-to-original-location distance recomputer 656. Additionally, for each cache it may be determined using a record version determiner 658 whether a record corresponding to an older version of the content is already stored in the cache and the content may be retrieved from the original location and stored in the cache using a content retriever 660 if a record corresponding to an older version of the content is already stored in the cache.

Figure 13:
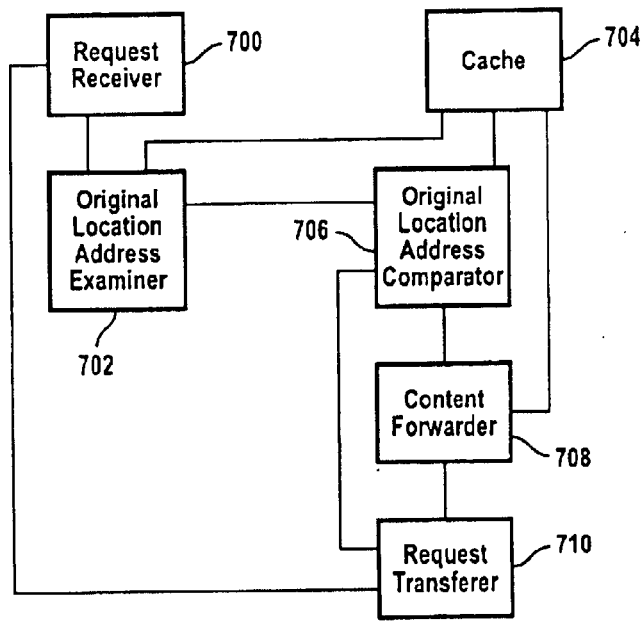

FIG. 13 is a block diagram illustrating an apparatus for handling a request for content from a user in a computer network in accordance with another embodiment of the present invention. A request receiver 700 receives the request at a switch or router. An original location address examiner 702 coupled to said request receiver 700 and to a cache 704 examines an original location address in a header in the request. An original location address comparator 706 coupled to said original location address examiner 702 and to said cache 704 compares the original location address with one or more entries in a table in said cache 704. A content forwarder 708 coupled to said original location address comparator and to said cache 704 forwards the content from the cache 704 to the user if an entry in the cache 704 has an original location field identical to said original location address. On the other hand, if the cache does not exist or the cache does not have an entry in the table with an original location field identical to the original location address, the request is transferred to another switch or router using a request transferer 710. The switch or router it is forwarded to should be one that is further along in a path ending with a web server hosting the content. This ensures that if no caches contain the content that it will still be possible for the user to retrieve the content directly from the web server.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for making content available for users in a computer network, the content having an original location, the method including:

forwarding the content to one or more caches distributed throughout the computer network, each of said caches coupled to a switch or router;

storing the content in each of said one or more caches; and storing a record identifying said content in each of said one or more caches, said record for any particular cache of said one or more caches having an original location field identifying the original location of said content, a distance field indicating a distance from said particular cache to the original location of said content, wherein said distance field is utilized upon receiving a request, said request including a SYN packet and an HUP packet, and a field indicating a version number of said content.

2. The method of claim 1, wherein said original location of said content includes a hypertext transfer protocol uniform resource locator.

3. The method of claim 1, wherein said record further includes a field indicating an IP address for a web server hosting said content.

4. The method of claim 3, wherein said field indicating an IP address further indicates a port number.

5. The method of claim 1, wherein said record further includes a field indicating a date and time of the last update to the record.

6. The method of claim 1, wherein said record further includes a field having a billing token or certificate for content peering between providers.

7. The method of claim 1, wherein said record further includes a tag field indicating a Quality of Service process to be applied when a user attempts to access the content.

8. The method of claim 1, wherein said record further includes a cache bypass field indicating whether said content need not be stored in said particular cache.

9. The method of claim 1, wherein said record further includes a server load balancing field indicating a server load balancing process to be applied when a user attempts to access the content.

10. The system of claim 1 wherein the HUP packet will contain the first url of the http address being requested.

11. The system of claim 10 wherein the HUP packet will take the form A-C-B, where A is the top-level domain name, C is the file name, and B is the rest of the address.

12. The system of claim 11 wherein the router or switch has the ability to determine how to handle the request based on just the top level domain name or based on just the top level domain name and the file type.

13. A method for making content available for users in a computer network, the content having an original location, the method including:
   receiving the content forwarded from the original location;
   storing the content in a cache coupled to a switch or router; and
   storing a record identifying the content in said cache, said record having an original location field identifying the original location of said content, a distance field indicating a distance from said cache to the original location of said content, wherein said distance field is utilized upon receiving a request, said request including a SYN packet and an HUP packet, and a field indicating a version number of said content.

14. The method of claim 13, wherein said original location of said content includes a hypertext transfer protocol uniform resource locator.

15. The method of claim 13, wherein said record further includes a field indicating an IP address for a web server hosting said content.

16. The method of claim 15, wherein said field indicating an IP address further indicates a port number.

17. The method of claim 13, wherein said record further includes a field indicating a date and time of the last update to the record.

18. The method of claim 13, wherein said record further includes a field having a billing token or certificate for content peering between providers.

19. The method of claim 13, wherein said record further includes a tag field indicating a Quality of Service process to be applied when a user attempts to access the content.

20. The method of claim 13, wherein said record further includes a cache bypass field indicating whether said content need not be stored in said cache.

21. The method of claim 13, wherein said record further includes a server load balancing field indicating a server load balancing process to be applied when a user attempts to access the content.

22. The system of claim 13 wherein the HUP packet will contain the first url of the http address being requested.

23. The system of claim 22 wherein the HUP packet will take the form A-C-B, where A is the top-level domain name, C is the file name, and B is the rest of the address.

24. The system of claim 23 wherein the router or switch has the ability to determine how to handle the request based on just the top level domain name or based on just the top level domain name and the file type.

25. A method for updating content in a computer network, the content located at a web server and having an original location, the method including:
   creating a routing table entry for the content in a cache, said routing table entry having a record with a location field with the original location of said content, a distance field indicating the distance from said cache to the original location of said content, wherein said distance field is utilized upon receiving a request, said request including a SYN packet and an HUP packet, and a version number field indicating a version number of said content; and
   forwarding said routing table entry to another of one or more caches in the computer network to allow said another of one or more caches to create a routing table entry for the content.

26. The method of claim 25, wherein said field with the original location of the content includes a hypertext transfer protocol uniform resource locator.

27. The method of claim 25, wherein said record further includes a field indicating an IP address for the web server.

28. The method of claim 27, wherein said field indicating the IP address further indicates a port number.

29. The method of claim 25, wherein said record further includes a field indicating the date and time of the last update to the record.

30. The method of claim 25, wherein said record further includes a field having a billing token or certificate for content peering between providers.

31. The method of claim 25, wherein said record further includes a tag field indicating a Quality of Service process to be applied when a user attempts to access the content.

32. The method of claim 25, wherein said record further includes a cache bypass field indicating whether said content need not be stored in said cache.

33. The method of claim 25, wherein said record further includes a server load balancing field indicating a server load balancing process to be applied when a user attempts to access the content.

34. The method of claim 25, further including:
   determining if a record corresponding to an older version of said content is already stored in said cache; and
   retrieving the content from said original location and storing it in said cache if a record corresponding to an older version of said content is already stored in said cache.

35. The method of claim 26, wherein said determining include examining said version number field of said record and comparing it with version number fields in records with identical location fields.

36. The method of claim 25, further including:
   detecting the alteration of the content with a server load balancer through polling of the web server.

37. The method of claim 25, further including:
   notifying a server load balancer that the content has been altered.

38. The method of claim 25 wherein the HUP packet will contain the first url of the http address being requested.

39. The method of claim 38 wherein the HUP packet will take the form A-C-B, where A is the top-level domain name, C is the file name, and B is the rest of the address.

40. The method of claim 39 wherein the router or switch has the ability to determine how to handle the request based on just the top level domain name or based on just the top level domain name and the file type.

41. An apparatus for updating content in a computer network, the content located at a web server and having an original location, the apparatus including:
- a cache;
- a routing table entry creator coupled to said cache, wherein said routing table entry creator creates a routing table entry for the content in a cache, said routing table entry having a record with a location field with the original location of said content, a distance field indicating the distance from said cache to the original location of said content, wherein said distance field is utilized upon receiving a request, said request including a SYN packet and an HUP packet; and
- a routing table entry forwarder coupled to said cache and to said routing table entry creator.

42. The apparatus of claim 41, further including:
- a record version determiner coupled to said cache; and
- a content retriever coupled to said record version determiner.

43. The apparatus of claim 41, further including a cache-to-original-location distance recomputer coupled to said routing table entry creator.

44. The program storage device of claim 41 wherein the HUP packet will contain the first url of the http address being requested.

45. The program storage device of claim 44 wherein the HUP packet will take the form A-C-B, where A is the top-level domain name, C is the file name, and B is the rest of the address.

46. The apparatus of claim 45 wherein the router or switch has the ability to determine how to handle the request based on just the top level domain name or based on just the top level domain name and the file type.

47. An apparatus for handling a request for content from a user in a computer network, including:
- a request receiver for receiving a request, said request including a SYN packet and an HUP packet;
- a cache;
- an original location address examiner coupled to said request receiver and to said cache;
- an original location address comparator coupled to said original location address examiner and to said cache receiving the request at a switch or router;
- a content forwarder coupled to said original location address comparator and to said cache; and
- a request transferer coupled to said request receiver and to said original location address comparator.

48. The apparatus of claim 47 wherein the HUP packet will contain the first url of the http address being requested.

49. The apparatus of claim 48 wherein the HUP packet will take the form A-C-B, where A is the top-level domain name, C is the file name, and B is the rest of the address.

50. The apparatus of claim 49 wherein the router or switch has the ability to determine how to handle the request based on just the top level domain name or based on just the top level domain name and the file type.

51. A program storage device readable by a machine, tangibly embodying a program of instructions executable by the machine for making content available for users in a computer network, the content having an original location, the method including:
- forwarding the content to one or more caches distributed throughout the computer network, each of said caches coupled to a switch or router;
- storing the content in each of said one or more caches; and
- storing a record identifying said content in each of said one or more caches, said record for any particular cache of said one or more caches having an original location field identifying the original location of said content, a distance field indicating a distance from said particular cache to the original location of said content, wherein said distance field is utilized upon receiving a request, said request including a SYN packet and an HUP packet, and a field indicating a version number of said content.

52. The system of claim 51 wherein the HUP packet will contain the first url of the http address being requested.

53. The system of claim 52 wherein the HUP packet will take the form A-C-B, where A is the top-level domain name, C is the file name, and B is the rest of the address.

54. The system of claim 53, wherein the router or switch has the ability to determine how to handle the request based on just the top level domain name or based on just the top level domain name and the file type.

55. A program storage device readable by a machine, tangibly embodying a program of instructions executable by the machine for making content available for users in a computer network, the content having an original location, the method including:
- receiving the content forwarded from the original location;
- storing the content in a cache coupled to a switch or router; and
- storing a record identifying the content in said cache, said record having an original location field identifying the original location of said content, a distance field indicating a distance from said cache to the original location of said content, wherein said distance field is utilized upon receiving a request, said request including a SYN packet and an HUP packet, and a field indicating a version number of said content.

56. The system of claim 55 wherein the HUP packet will contain the first url of the http address being requested.

57. The system of claim 56 wherein the HUP packet will take the form A-C-B, where A is the top-level domain name, C is the file name, and B is the rest of the address.

58. The system of claim 57 wherein the router or switch has the ability to determine how to handle the request based on just the top level domain name or based on just the top level domain name and the file type.

59. A program storage device readable by a machine, tangibly embodying a program of instructions executable by the machine for updating content in a computer network, the content located at a web server and having an original location, the method including:
- creating a routing table entry for the content in a cache, said routing table entry having a record with a location field with the original location of said content, a distance field indicating the distance from said cache to the original location of said content, wherein said distance field is utilized upon receiving a request, said request including a SYN packet and an HUP packet, and a version number field indicating a version number of said content;
- forwarding said routing table entry to another of one or more caches in the computer network; and
- repeating said creating and forwarding for each of said one or more caches.

60. The system of claim 59 wherein the HUP packet will contain the first url of the http address being requested.

61. The system of claim 60 wherein the HUP packet will take the form A-C-B, where A is the top-level domain name, C is the file name, and B is the rest of the address.

62. The system of claim 61 wherein the router or switch has the ability to determine how to handle the request based on just the top level domain name or based on just the top level domain name and the file type.

63. A program storage device readable by a machine, tangibly embodying a program of instructions executable by the machine for updating content in a computer network, the content located at a web server and having an original location, the method including:
creating a routing table entry for the content in a cache, said routing table entry having a record with a location field with the original location of said content, a distance field indicating the distance from said cache to the original location of said content, wherein said distance field is utilized upon receiving a request, said request including a SYN packet and an HUP packet, and a version number field indicating a version number of said content; and
forwarding said routing table entry to another of one or more caches in the computer network to allow said another of one or more caches to create a routing table entry for the content.

64. The system of claim 63 wherein the HUP packet will contain the first url of the http address being requested.

65. The system of claim 64 wherein the HUP packet will take the form A-C-B, where A is the top-level domain name, C is the file name, and B is the rest of the address.

66. The system of claim 65 wherein the router or switch has the ability to determine how to handle the request based on just the top level domain name or based on just the top level domain name and the file type.

67. An apparatus for making content available for users in a computer network, the content having an original location, the apparatus including:
a memory;
a network interface coupled to said memory;
a processor coupled to said memory programmed to perform the steps of:
forwarding the content to one or more caches distributed throughout the computer network, each of said caches coupled to a switch or router;
storing the content in each of said one or more caches; and
storing a record identifying said content in each of said one or more caches, said record for any particular cache of said one or more caches having an original location field identifying the original location of said content, a distance field indicating a distance from said particular cache to the original location of said content, wherein said distance field is utilized upon receiving a request, said request including a SYN packet and an HUP packet, and a field indicating a version number of said content.

68. The system of claim 67 wherein the HUP packet will contain the first url of the http address being requested.

69. The system of claim 68 wherein the HUP packet will take the form A-C-B, where A is the top-level domain name, C is the file name, and B is the rest of the address.

70. The system of claim 69 wherein the router or switch has the ability to determine how to handle the request based on just the top level domain name or based on just the top level domain name and the file type.

71. An apparatus for making content available for users in a computer network, the content having an original location, the apparatus including:
a memory;
a network interface coupled to said memory;
a processor coupled to said memory programmed to perform the steps of:
receiving the content forwarded from the original location;
storing the content in a cache coupled to a switch or router; and
storing a record identifying the content in said cache, said record having an original location field identifying the original location of said content, a distance field indicating a distance from said cache to the original location of said content, wherein said distance field is utilized upon receiving a request, said request including a SYN packet and an HUP packet, and a field indicating a version number of said content.

72. The system of claim 71 wherein the HUP packet will contain the first url of the http address being requested.

73. The system of claim 72 wherein the HUP packet will take the form A-C-B, where A is the top-level domain name, C is the file name, and B is the rest of the address.

74. The system of claim 73 wherein the router or switch has the ability to determine how to handle the request based on just the top level domain name or based on just the top level domain name and the file type.

75. An apparatus for updating content in a computer network, the content located at a web server and having an original location, the apparatus including:
a memory;
a network interface coupled to said memory;
a processor coupled to said memory programmed to perform the steps of:
creating a routing table entry for the content in a cache, said routing table entry having a record with a location field with the original location of said content, a distance field indicating the distance from said cache to the original location of said content, wherein said distance field is utilized upon receiving a request, said request including a SYN packet and an HUP packet, and a version number field indicating a version number of said content;
forwarding said routing table entry to another of one or more caches in the computer network; and
repeating said creating and forwarding for each of said one or more caches.

76. The system of claim 75 wherein the HUP packet will contain the first url of the http address being requested.

77. The system of claim 76 wherein the HUP packet will take the form A-C-B, where A is the top-level domain name, C is the file name, and B is the rest of the address.

78. The system of claim 77 wherein the router or switch has the ability to determine how to handle the request based on just the top level domain name or based on just the top level domain name and the file type.

79. An apparatus for updating content in a computer network, the content located at a web server and having an original location, the apparatus including:
a memory;
a network interface coupled to said memory;
a processor coupled to said memory programmed to perform the steps of:
creating a routing table entry for the content in a cache, said routing table entry having a record with a location field with the original location of said content, a distance field indicating the distance from said cache to the original location of said content, wherein said distance field is utilized upon receiving a request, said request including a SYN packet and an HUP packet, and a version number field indicating a version number of said content; and forwarding said routing table entry to another of one or more caches in the computer network to allow said another of one or more caches to create a routing table entry for the content.

80. The system of claim 79 wherein the HUP packet will contain the first url of the http address being requested.

81. The system of claim 80 wherein the HUP packet will take the form A-C-B, where A is the top-level domain name, C is the file name, and B is the rest of the address.

82. The system of claim 81 wherein the router or switch has the ability to determine how to handle the request based on just the top level domain name or based on just the top level domain name and the file type.

83. An apparatus for making content available for users in a computer network, the content having an original location, the apparatus including:

means for forwarding the content to one or more caches distributed throughout the computer network, each of said caches coupled to a switch or router;

means for storing the content in each of said one or more caches; and means for storing a record identifying said content in each of said one or more caches, said record for any particular cache of said one or more caches having an original location field identifying the original location of said content, a distance field indicating a distance from said particular cache to the original location of said content, wherein said distance field is utilized upon receiving a request, said request including a SYN packet and an HUP packet, and a field indicating a version number of said content.

84. The system of claim 83 wherein the HUP packet will contain the first url of the http address being requested.

85. The system of claim 84 wherein the HUP packet will take the form A-C-B, where A is the top-level domain name, C is the file name, and B is the rest of the address.

86. The system of claim 85 wherein the router or switch has the ability to determine how to handle the request based on just the top level domain name or based on just the top level domain name and the file type.

87. An apparatus for making content available for users in a computer network, the content having an original location, the apparatus including:

means for receiving the content forwarded from the original location;

means for storing the content in a cache coupled to a switch or router; and means for storing a record identifying the content in said cache, said record having an original location field identifying the original location of said content, a distance field indicating a distance from said cache to the original location of said content, wherein said distance field is utilized upon receiving a request, said request including a SYN packet and an HUP packet, and a field indicating a version number of said content.

88. An apparatus for updating content in a computer network, the content located at a web server and having an original location, the apparatus including:

means for creating a routing table entry for the content in a cache, said routing table entry having a record with a location field with the original location of said content, a distance field indicating the distance from said cache to the original location of said content, wherein said distance field is utilized upon receiving a request, said request including a SYN packet and an HUP packet, and a version number field indicating a version number of said content;

means for forwarding said routing table entry to another of one or more caches in the computer network; and means for repeating said creating and forwarding for each of said one or more caches.

89. An apparatus for updating content in a computer network, the content located at a web server and having an original location, the apparatus including:

means for creating a routing table entry for the content in a cache, said routing table entry having a record with a location field with the original location of said content, a distance field indicating the distance from said cache to the original location of said content, wherein said distance field is utilized upon receiving a request, said request including a SYN packet and an HUP packet, and a version number field indicating a version number of said content; and means for forwarding said routing table entry to another of one or more caches in the computer network to allow said another of one or more caches to create a routing table entry for the content.

* * * * *

UNITED STATES PATENT AND TRADEMARK OFFICE
CERTIFICATE OF CORRECTION

PATENT NO. : 6,850,980 B1
DATED : February 1, 2005
INVENTOR(S) : Gourlay

It is certified that error appears in the above-identified patent and that said Letters Patent is hereby corrected as shown below:

Title page,
Item [54] Title, replace "SERVICE" with -- SERVICES --.

Column 4,
Line 21, replace "uris" with -- urls --.
Line 26, replace ".gif)" with -- .gif") --.

Column 5,
Line 39, replace ".gif'" with -- .gif' --.
Line 40, replace "302" with -- 302 --.
Line 42, replace "undated" with -- updated --.

Signed and Sealed this

Twenty-third Day of August, 2005

JON W. DUDAS
*Director of the United States Patent and Trademark Office*